March 17, 1964     A. B. ARONSON     3,125,289
VOTING MACHINE AND DESIGN

Filed March 23, 1960     13 Sheets-Sheet 1

INVENTOR:
AARON B. ARONSON
BY:
Beau, Brooks, Buckley & Beau,
ATTORNEYS.

March 17, 1964      A. B. ARONSON      3,125,289
VOTING MACHINE AND DESIGN
Filed March 23, 1960      13 Sheets-Sheet 2
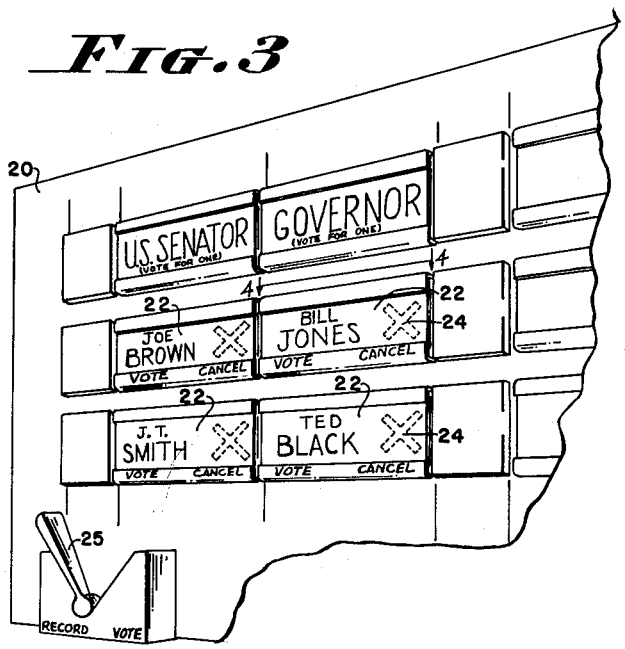
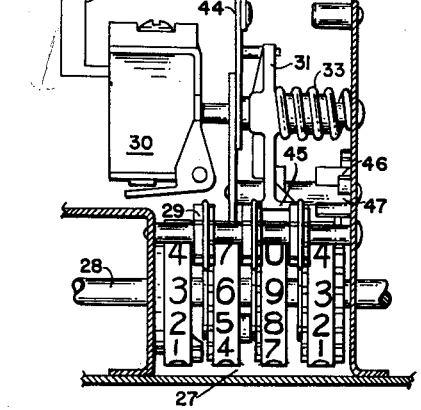
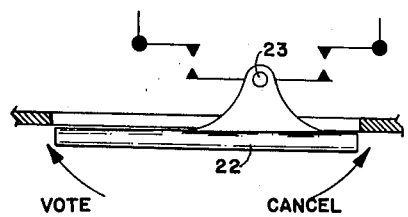
FIG. 4
FIG. 5
INVENTOR:
AARON B. ARONSON
BY:
Beau, Brooke, Buckley & Beau,
ATTORNEYS.

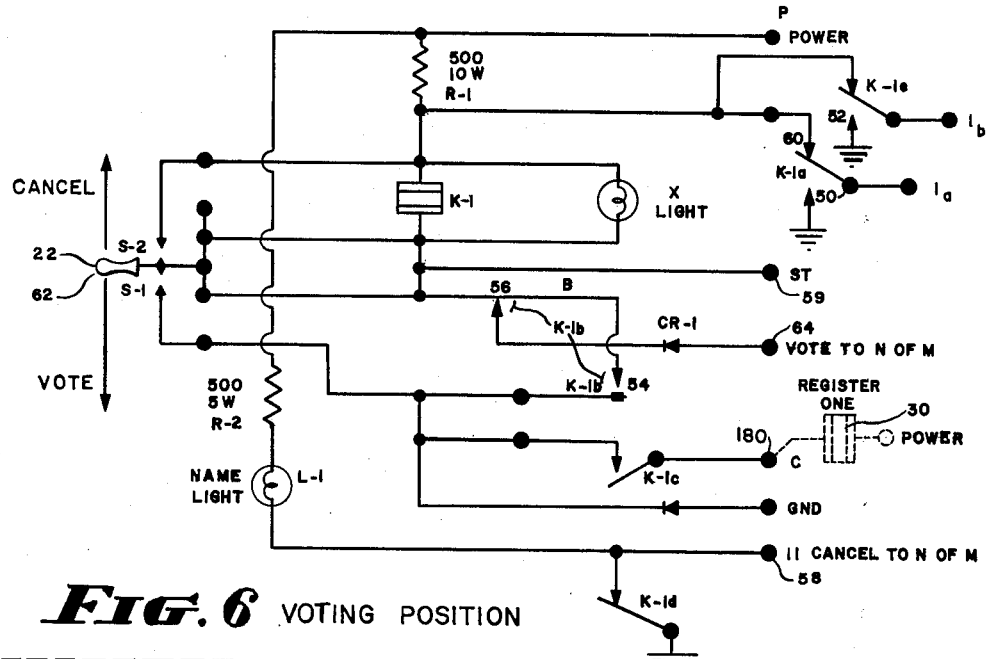
FIG. 6 VOTING POSITION
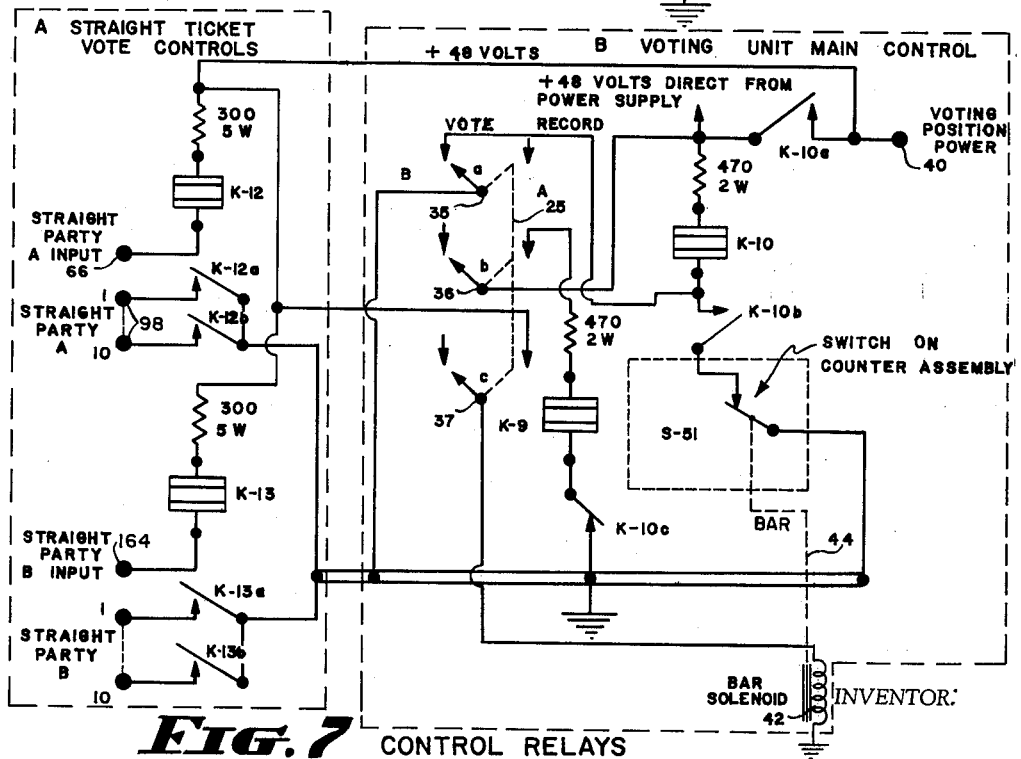
FIG. 7 CONTROL RELAYS

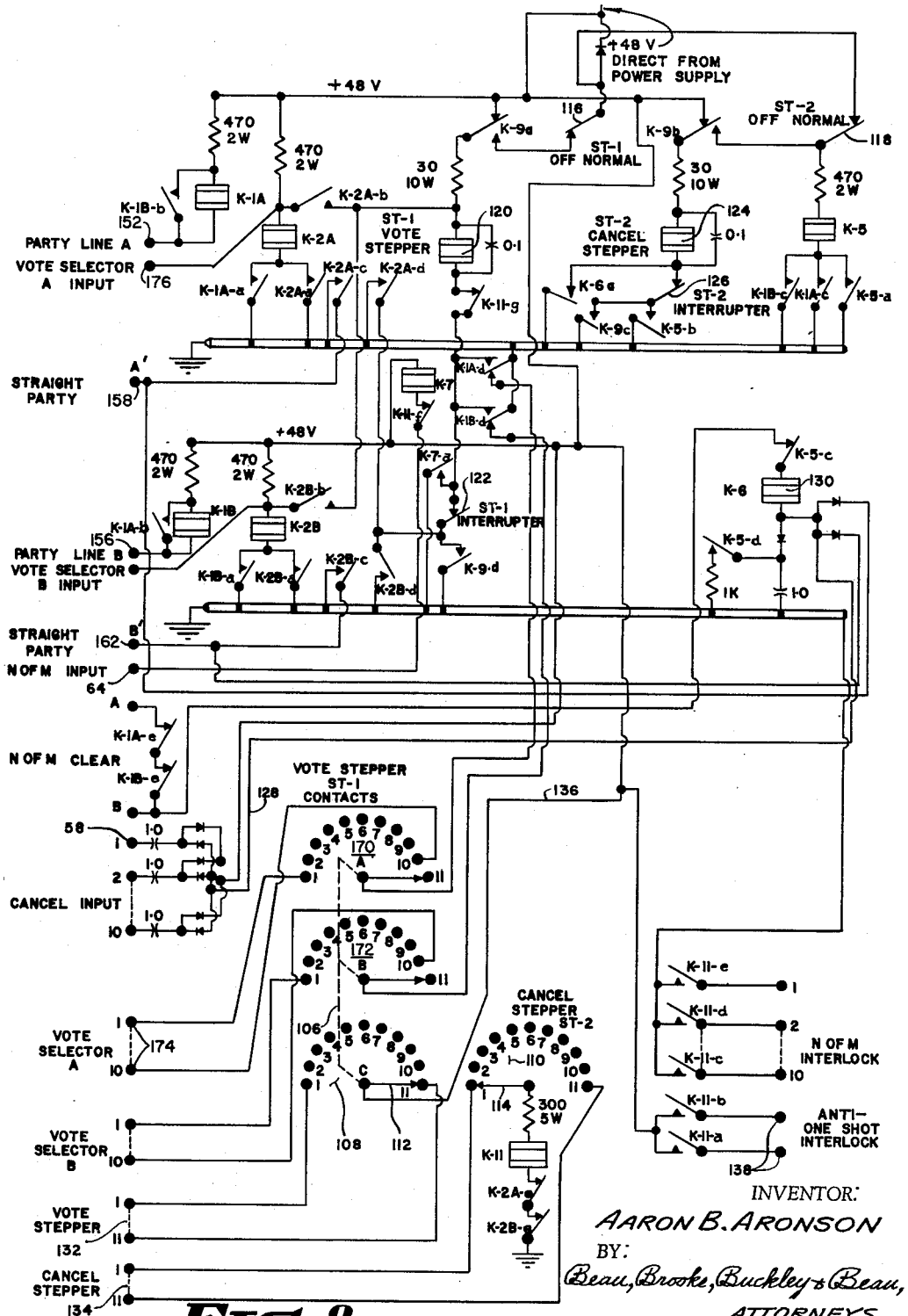
FIG. 8 N OF M COUNTER

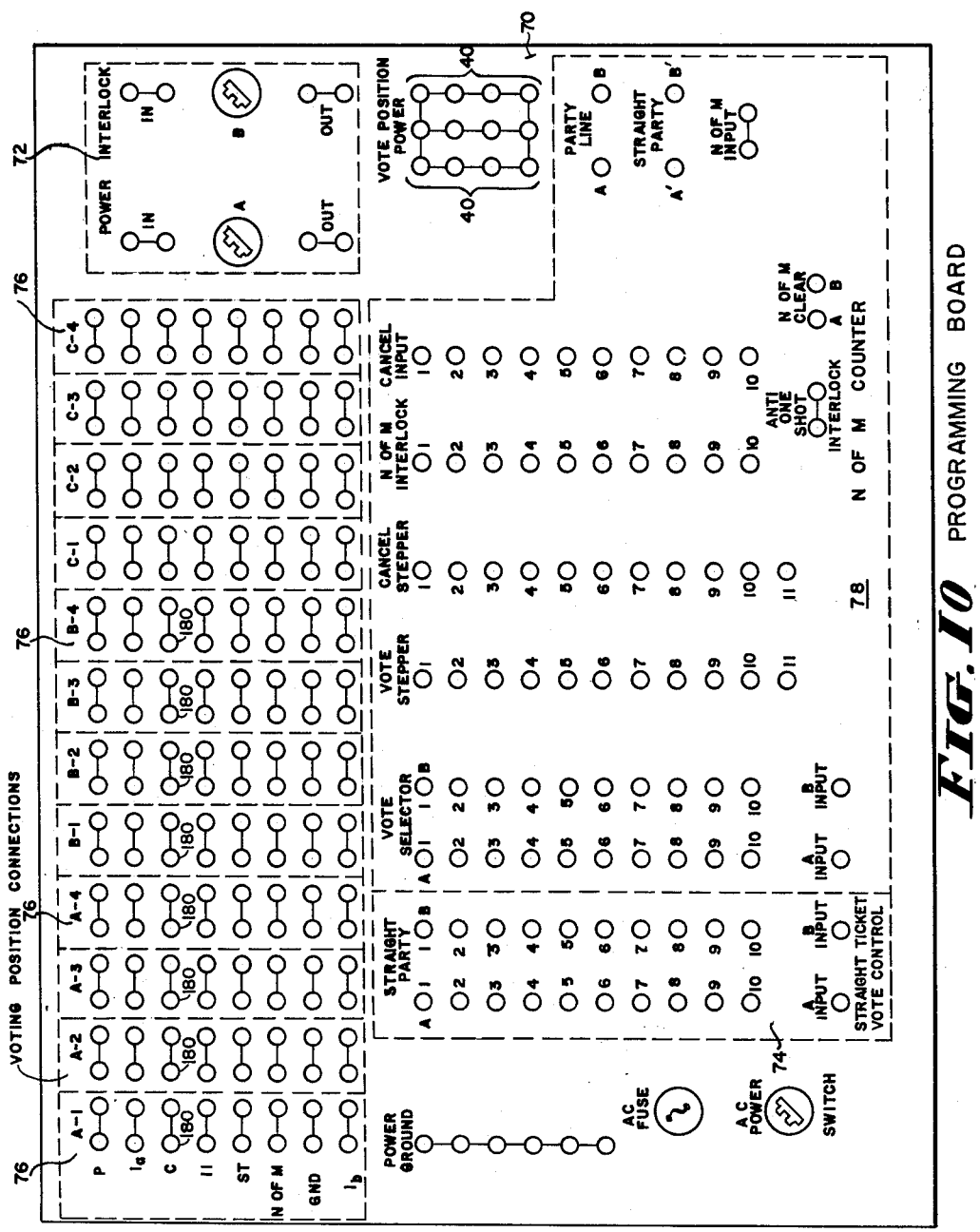
FIG. 10 PROGRAMMING BOARD

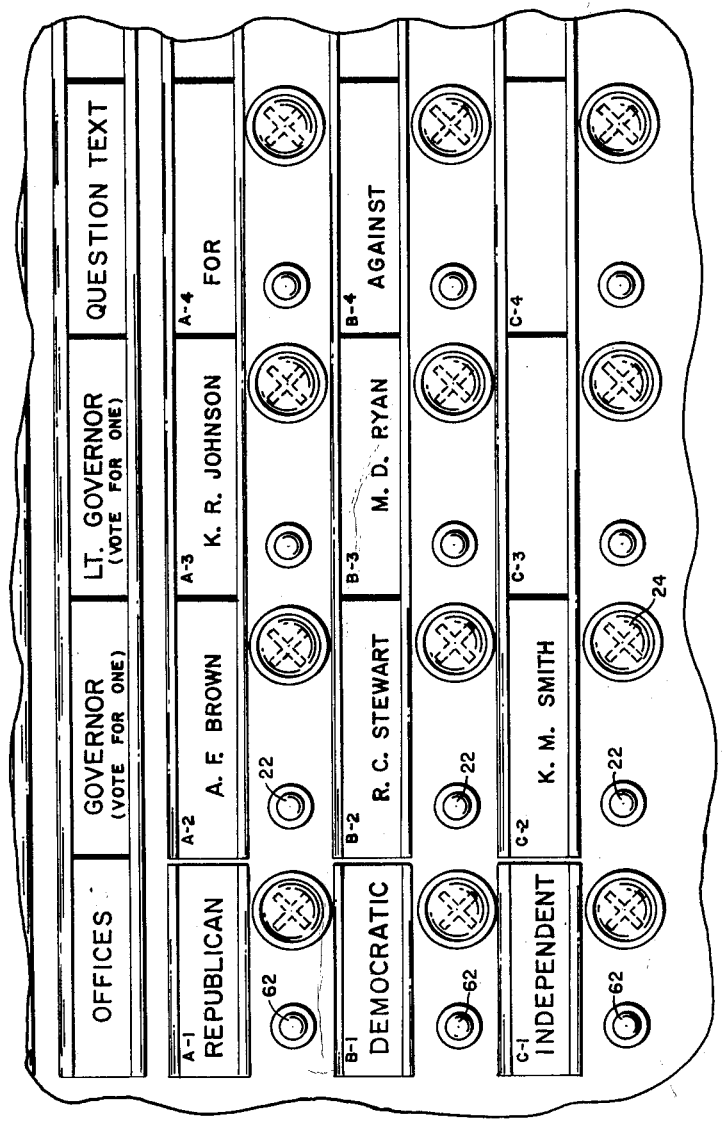

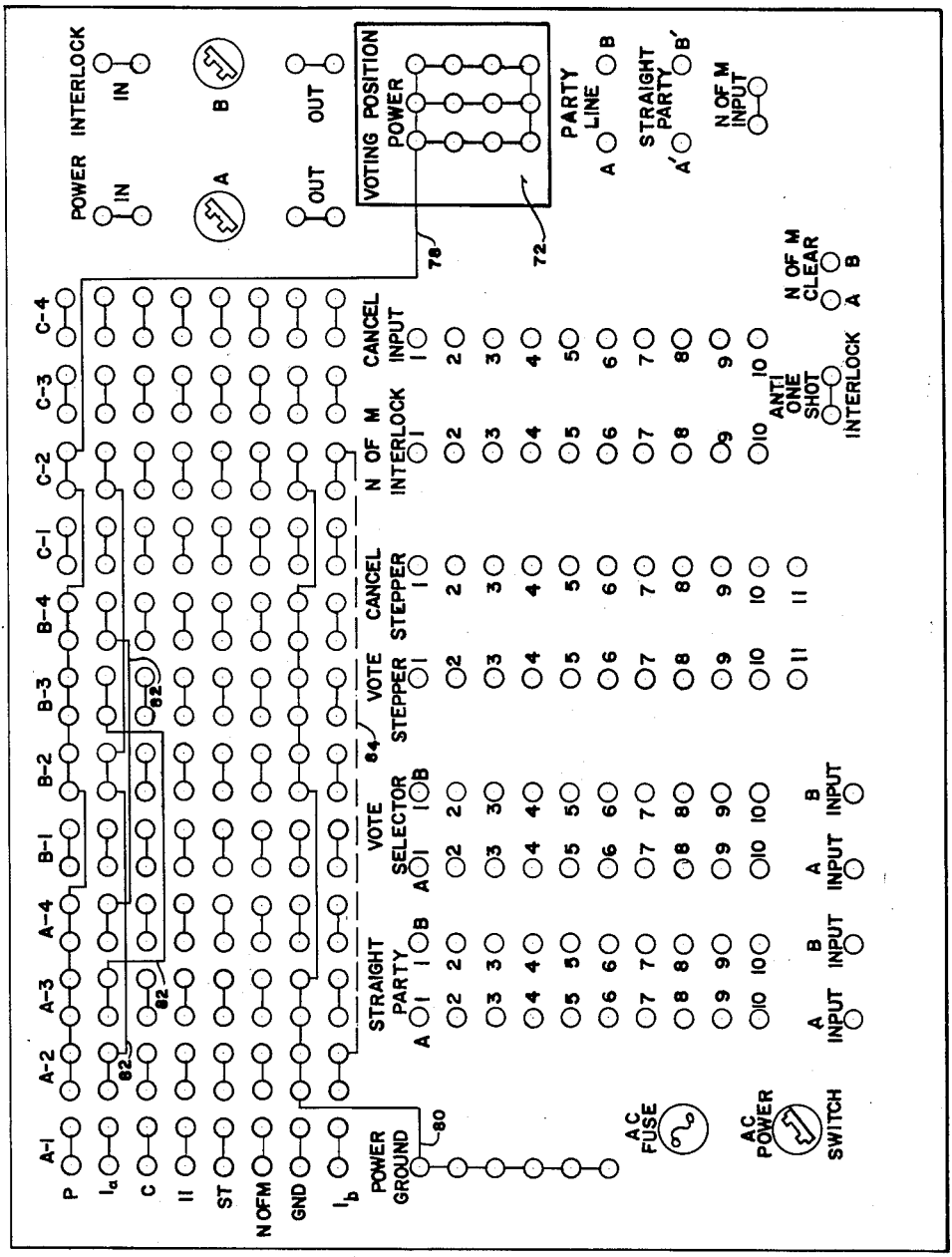
FIG. 12 SINGLE OFFICE

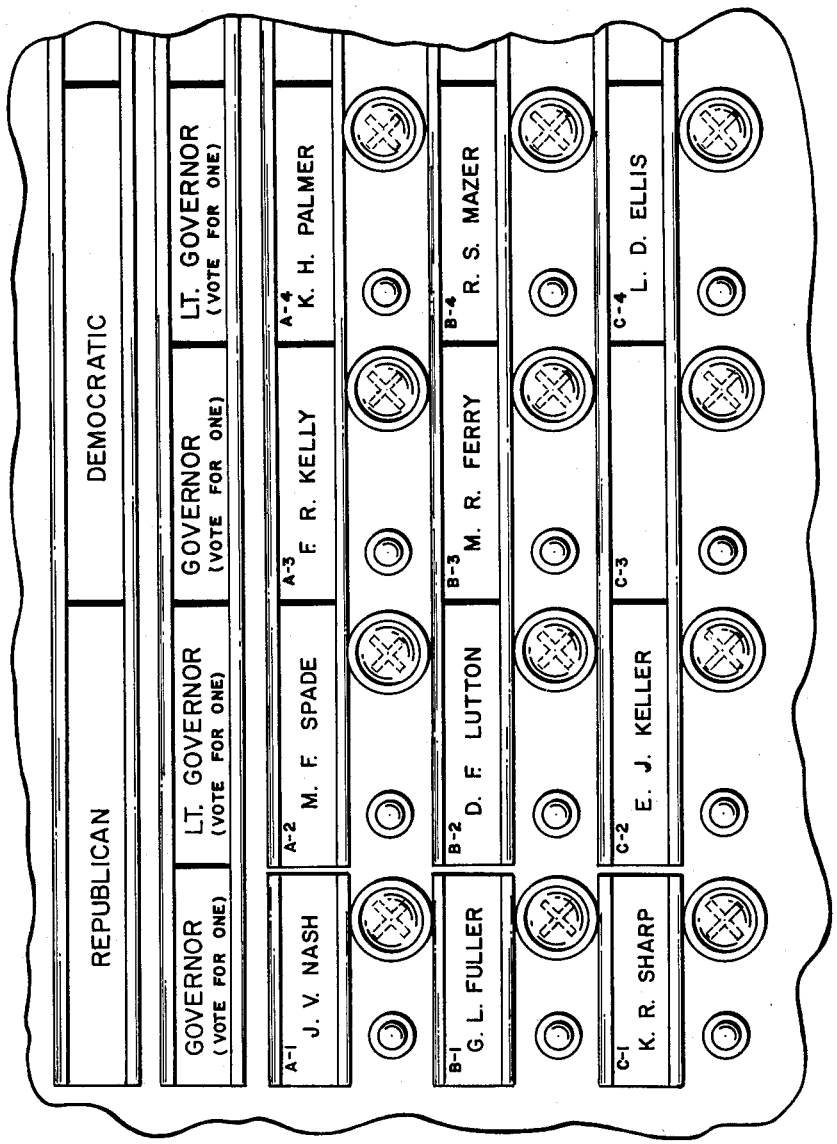
FIG. 13 OPEN PRIMARY BALLOT LAYOUT

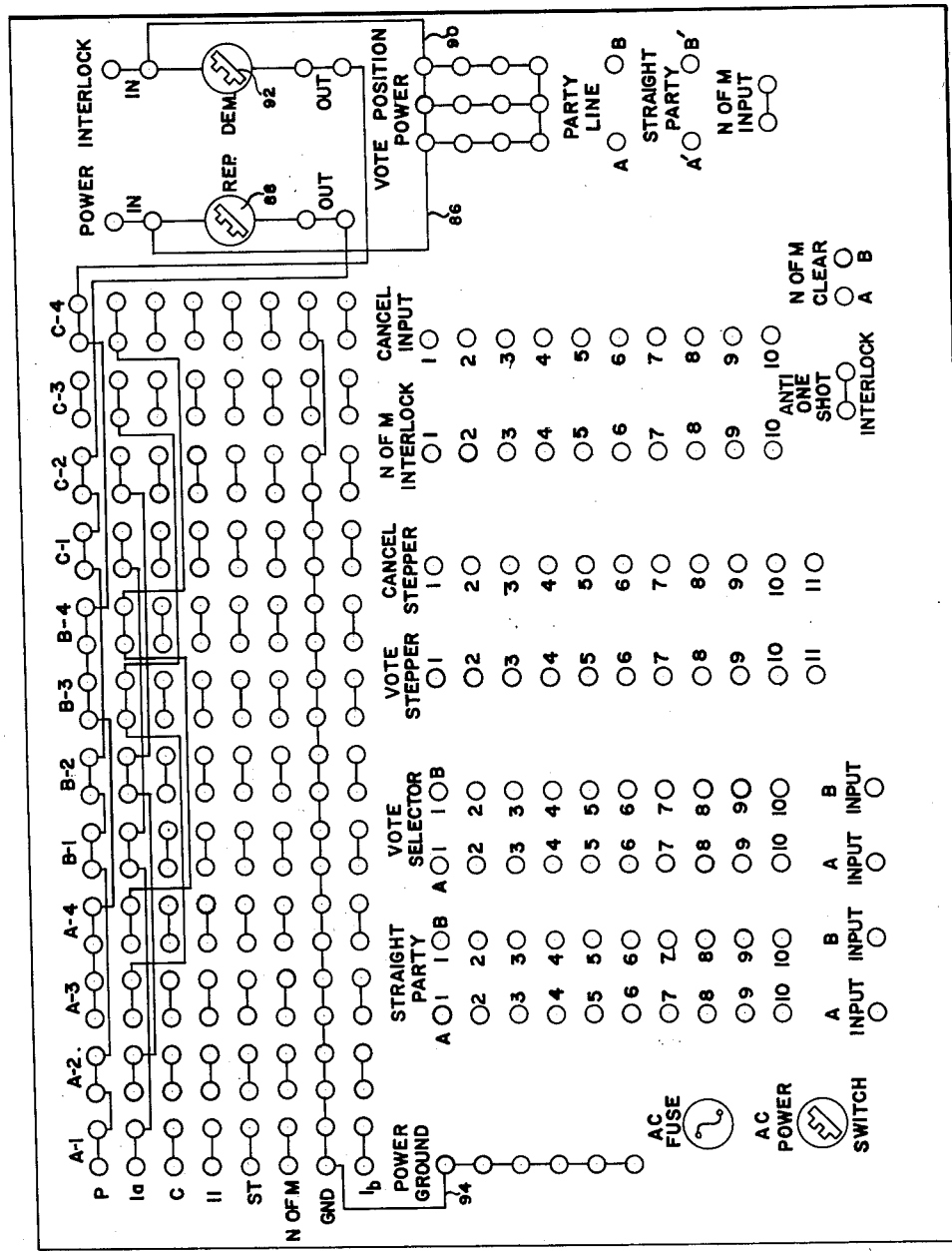
FIG. 14 PRIMARY OR RESTRICTED VOTE

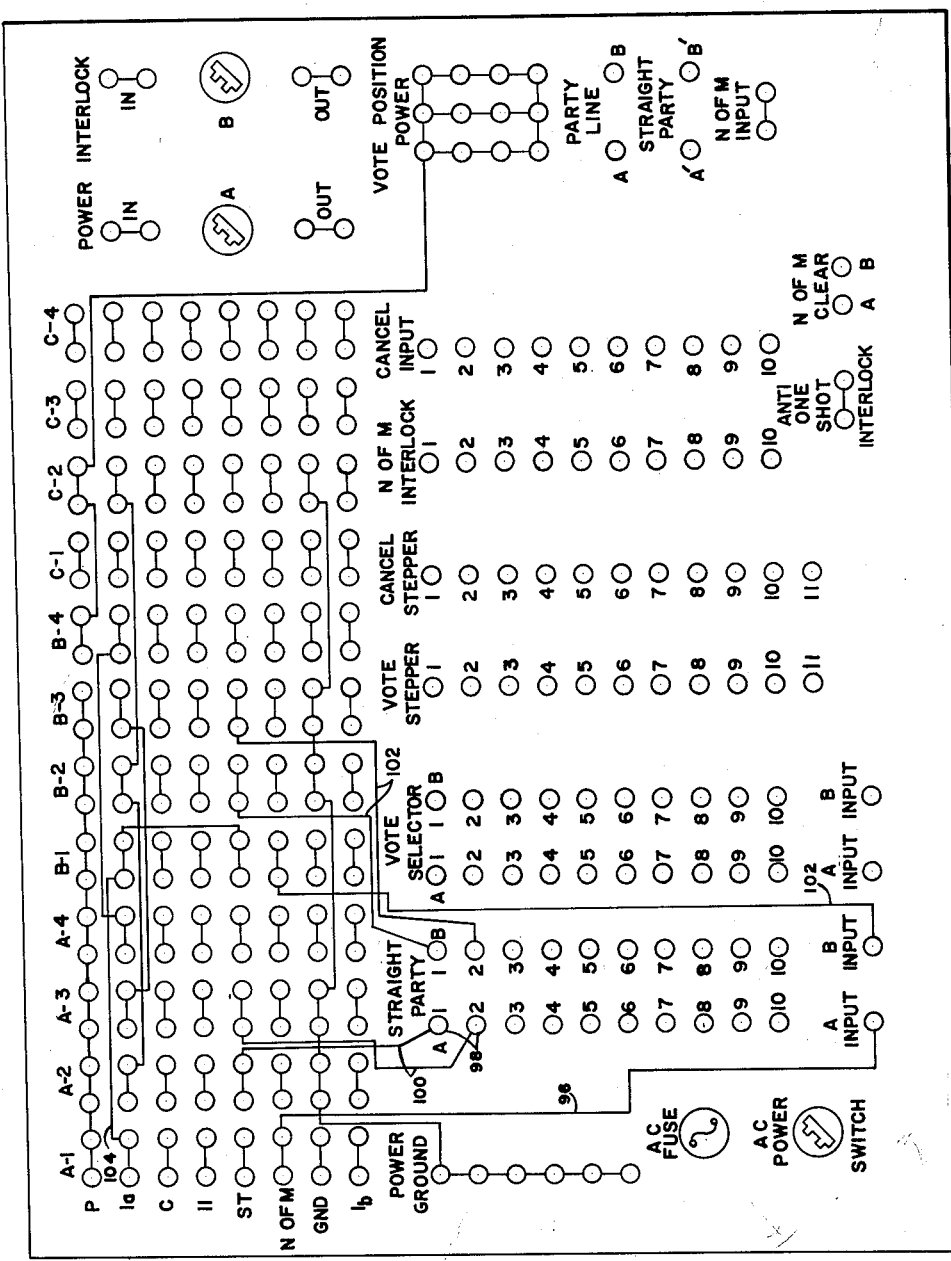
FIG. 15 STRAIGHT PARTY VOTE

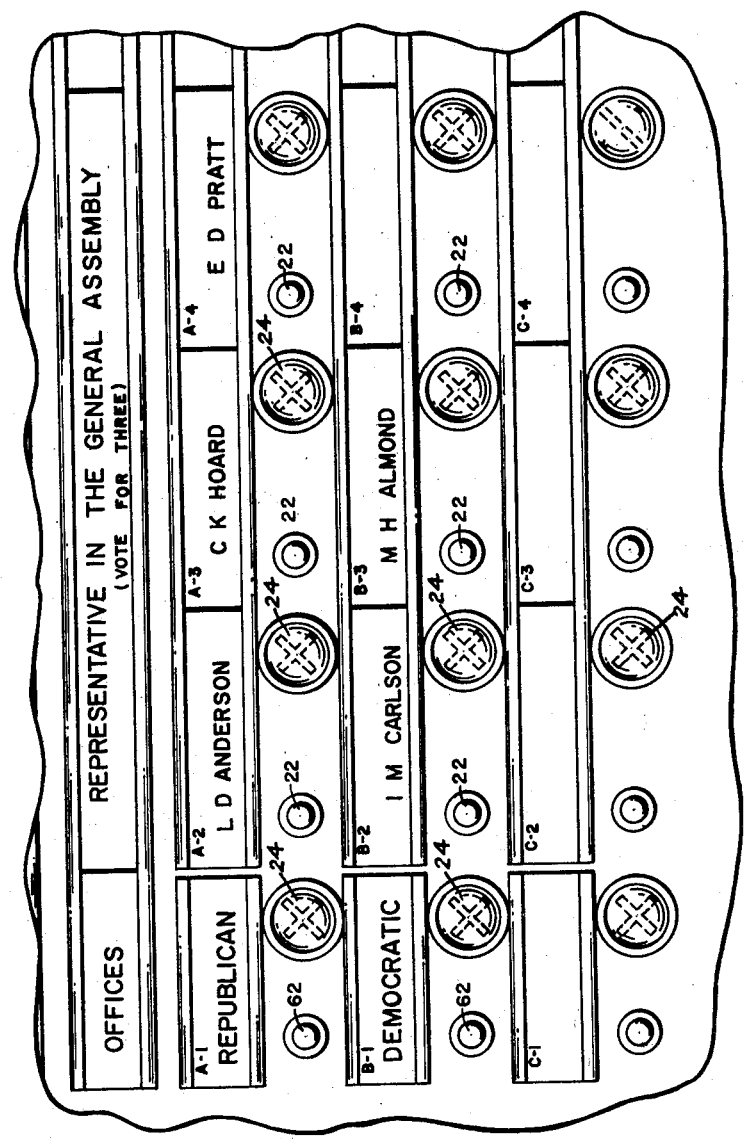
FIG. 16  GROUP OFFICE BALLOT LAYOUT

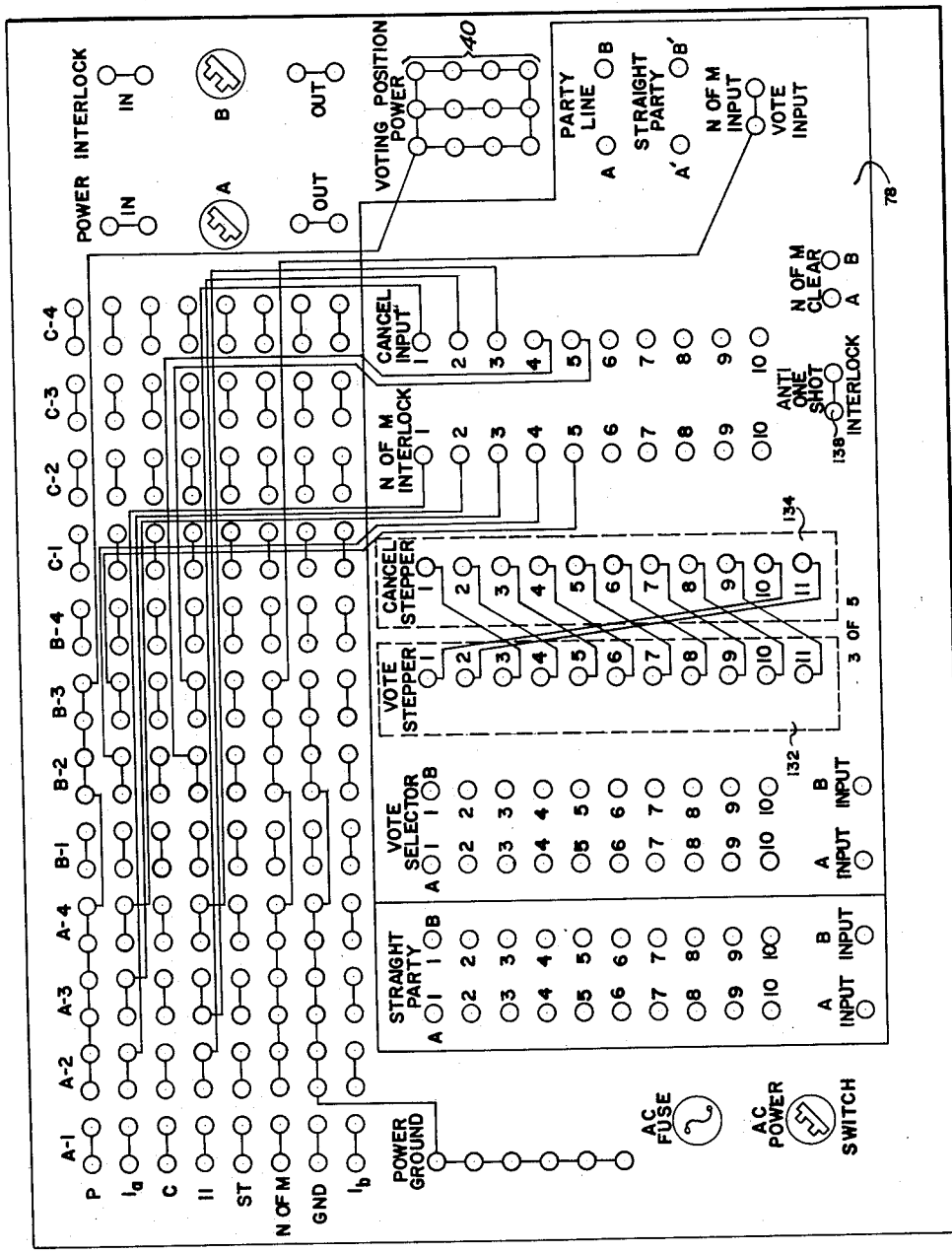
FIG. 17 GROUP OFFICE

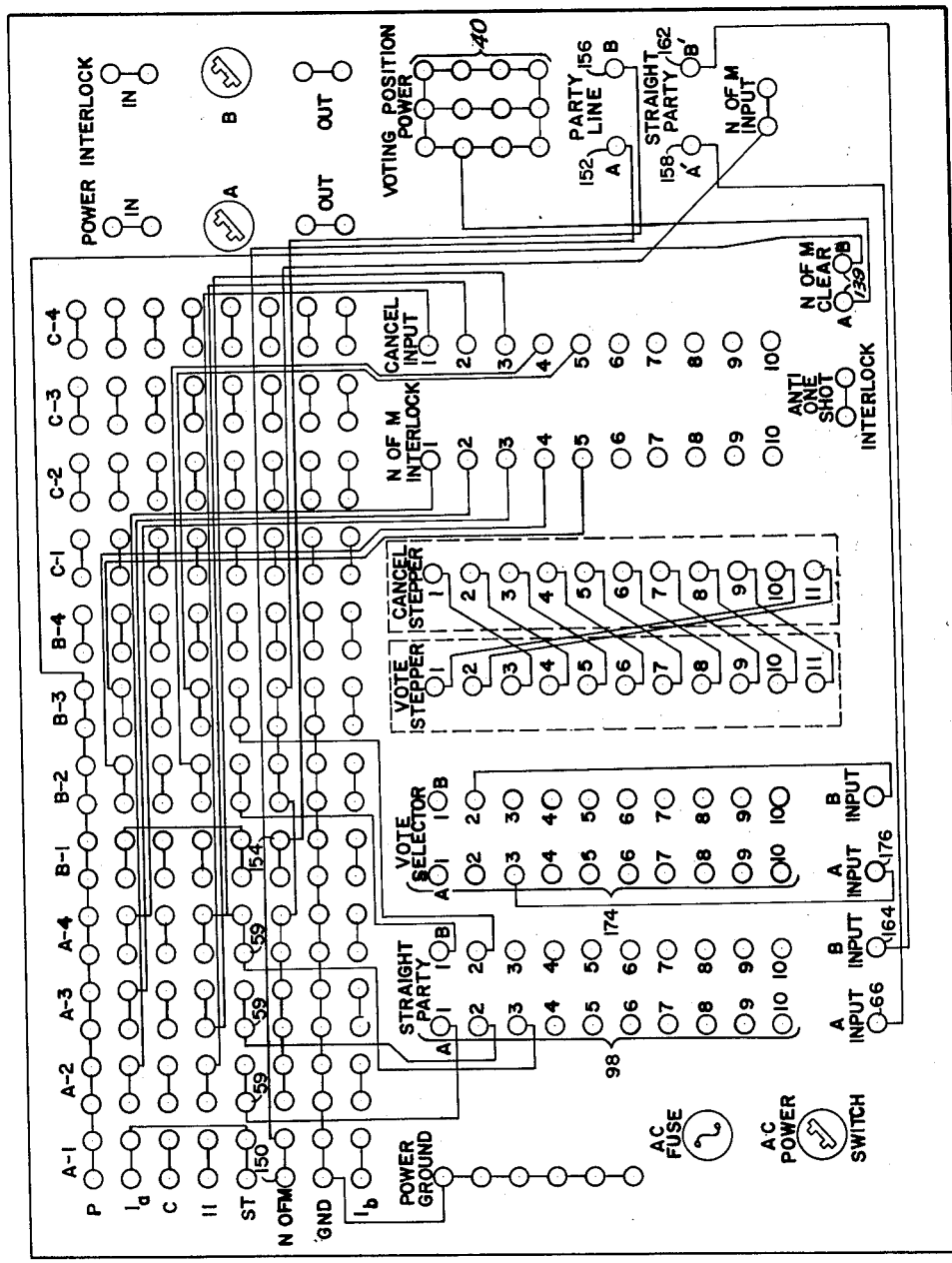

United States Patent Office 3,125,289
Patented Mar. 17, 1964

3,125,289
VOTING MACHINE AND DESIGN
Aaron B. Aronson, 2437 Harrison St., Glenview, Ill.
Filed Mar. 23, 1960, Ser. No. 24,637
16 Claims. (Cl. 235—54)

This invention relates to an electoral voting machine, and more particularly to an improved electro-mechanical type voting machine for use in conjunction with a vote registering device which may be either directly mounted on the voting machine or located at some more convenient position remotely therefrom.

One of the objects of the present invention is to provide a machine as aforesaid, which is of improved versatility and provides improved flexibility for ballot layout purposes.

Another object of the invention is to provide an improved machine as aforesaid which is of reduced size and weight compared to prior art voting machines.

Still another object of the invention is to provide an improved machine as aforesaid which is of increased reliability and which is fraud-proof in operation.

Still another object is to provide an improved machine as aforesaid which employs relatively simple electrical circuitry and simple and rugged mechanical parts.

Other objects and advantages of the invention will appear from the specification hereinafter.

In the accompanying drawings:

FIG. 1 is a fragmentary front elevational view of a voting unit front panel portion of a machine exemplary of the invention having a typical election ballot arrangement thereon;

FIG. 2 is a fragmentary section on enlarged scale taken on line 2—2 of FIG. 1;

FIG. 3 is a view corresponding to FIG. 1, but of a modified form of panel and ballot arrangement;

FIG. 4 is an enlarged scale fragmentary sectional view of a voting switch taken on line 4—4 of FIG. 3;

FIG. 5 is a fragmentary section, on enlarged scale, of a component of the associated total vote register, as taken along line 5—5 of FIG. 9;

FIG. 6 is a schematic diagram of the voting switch and circuitry associated with each voting position, such as on the panels of either FIGS. 1 or 3;

FIG. 7 is a schematic diagram of the voting unit main control and circuitry associated with the "straight ticket" vote controls;

FIG. 8 is a schematic diagram of the circuitry associated with the N of M counter system, as applied by way of example to group offices;

FIG. 9 is a fragmentary view of a totalizing vote register such as might be employed in conjunction with the voting machine of the invention;

FIG. 10 is an enlarged scale view of one form of the programming board component of the machine, with no programming connections shown;

FIG. 11 is a reduced size sample "single office" election ballot for use with a sample 12 front voting machine of the present invention; it being understood that the same principles may be applied to machines of any other required number of points;

FIG. 12 is a view corresponding to FIG. 10 but showing the programming connections required for the ballot of FIG. 11;

FIG. 13 is a view corresponding to FIG. 11 but shows an "open primary" type ballot layout;

FIG. 14 corresponds to FIG. 12 but shows the programming required for FIG. 13;

FIG. 15 corresponds to FIG. 10 but shows the programming required for the ballot of FIG. 11 with straight ticket voting provisions;

FIG. 16 is a view corresponding to FIG. 11 but showing a group office arrangement;

FIG. 17 is a view corresponding to FIG. 10 but having the programming required for the ballot of FIG. 16;

FIG. 18 corresponds to FIG. 10 but shows the programming required for the ballot arrangement of FIG. 16 with straight ticket voting provisions.

As shown for example in FIGS. 1 and 3 herewith, voting machine units of the present invention may be conveniently constructed to each comprise generally a casing portion 20 the front panel portion of which is provided with a changeable ballot face comprising vertically and horizontally aligned card carriers into which may be slip-fitted candidate and question designation indicia. A vote selecting switch as indicated at 22 is provided adjacent each voting point. As shown in FIGS. 1 and 2, each voting switch is a single pole momentary double throw switch and is normally in open position as shown in FIG. 2, but may be deflected in opposite directions therefrom in order to either enter or cancel a voting selection. In FIGS. 3, 4 the voting switches are shown to be of rocker form and pivoted as indicated at 23 (FIG. 4) so as to be alternatively deflected in opposite directions to either vote or cancel the selections. Also associated with each vote selection switch is a vote indicating light as indicated at 24 (FIG. 1), corresponding lights being conveniently arranged in the case of FIG. 3 behind the candidate name carrying panels which are in that case preferably formed of translucent or transparent material, whereby in both cases the X marks are illuminated automatically whenever the voter makes a voting selection.

A basic machine control switch as indicated at 25 (FIGS. 1, 3) may be conveniently mounted on the front panel of the voting machine and so arranged as to be manually displaced by a voter to the "voting" position as indicated on the switch base to ready the machine for his voting selections. Then, after his selections are complete, the voter displaces the switch arm 25 to the "recording position" shown thereon as he leaves the machine, whereupon his vote selections are automatically transferred to the associated register which, as stated hereinabove, may be either directly attached to the voting machine or may be disposed at some position remote therefrom.

As shown in FIG. 9, the vote register component of the machine may also conveniently include a casing 26 having a wall panel behind which are mounted pluralities of counterwheel stacks as indicated generally at 27, whereby the accumulated total votes for the respective candidates and/or the answers with respect to questions presented to the voters, will appear in the panel windows for visual readings of the exposed counterwheel digits; or in lieu thereof a printed record may be taken therefrom. As shown for example in FIG. 5, each counterwheel stack may be of the conventional counterwheel accumulator mechanism form comprising essentially a shaft upon which are mounted a plurality of counterwheels interconnected by transfer gear devices as indicated at 29. Each stack unit includes an "advance cam" 31 which is moved axially by a solenoid 30 whenever the corresponding vote selection is made, from the position thereof shown in FIG. 5 to the right thereof in line with the first counterwheel unit of the stack.

As shown in FIG. 7, the circuitry connected to the voting unit main control switch (which in this case comprises a 3-pole double throw switch having contacts 35, 36, 37) is arranged so that when the switch is in voting position as shown in FIG. 7 and with the switch lever 25 thrown to the left as shown in FIGS. 1 and 3, 7, the machine will be in condition to receive a voter's selections. Then, later when the voter prepares to leave the machine he throws the switch lever to the right, and thereby opens the contacts of the switch 25 and closes the opposite contacts.

When the switch 25 is in "record" position the relay K–9 will be energized through the normally closed contact of relay K–10c. However, when a new voter enters the machine and turns the control lever 25 to the left as shown in the drawing herewith, he thereby supplies the ground potential to the coil of the relay K–10 through switch contact 35. This will energize the relay causing contact K–10a thereof of close, thereby providing power to the voting position multiple interconnected power terminals 40 (FIGS. 7, 10). The relay contact K–10b is simultaneously closed and thereby will lock its own coil into operating condition. Simultaneously, contact K–10c of relay K–10 will open thereby deenergizing the relay K–9. The machine is now set to receive the voter's selections, which he performs by appropriate manipulation of the control switches 22 as explained hereinabove; as a consequence of which the cams 31 of the mechanisms of FIG. 5 are appropriately shifted into position to cause registry of selected votes when the voter subsequently deflects the switch 25 to the right preparatory to leaving the machine.

When the voter moves the control switch 25 to the right, to "record" position, the contact 37 of switch 25 supplies positive power to the solenoid 42 (FIG. 7) which is operatively connected to an oscillatable control bar 44 (FIG. 5) which then functions to rotate the cam 31 sufficiently so that its bottom shoe portion 45 will in turn rotate the teeth 46 of the pinion 47 which operates the units wheel of the conuterwheel stack. Thus, each impulse of the solenoid 42 will cause the units wheel of the counterwheel stack to advance one digit provided that the solenoid 30 was previously operated to cause the cam 31 to be displaced to the right as shown in FIG. 5 into meshed relation with the pinion 47. As shown in FIG. 7, the control bar 44 also connects to a single throw switch S–51 which is thereby caused to open at the end of the power control bar travel, thereby deenergizing the coil of the relay K–10. This in turn causes interruption of the power to all of the voting positions and causes the solenoids 30 to be deenergized, whereby their compression spring devices 33 (FIG. 5) restore their cams 31 to their normal positions as shown in FIG. 5 of the drawing.

The bar control solenoid 42 is constructed to restore the bar to its original position following a slight time delay, whereby opportunity is provided for the counter control cams 31 to be returned to their normal axial positions by their compression springs prior to restoration of the counter control bar 44 to its normal position. Thus, all the cams 31 of the system are thereby returned to their normal positions toward the left as viewed in FIG. 5 and to their normal positions rotatively upon their axles prior to having been displaced therefrom by operation of the control bar 44. Thus the voting unit is now restored to its normal position, preparatory to reception of the next voter.

FIG. 6 illustrates the circuitry associated with each voting switch. A name light L–1 is provided to back light the candidate's name prior to voting selection. Upon voter manipulation of the main control switch 25 over to the "vote" position, each voting position circuit as shown in FIG. 6 that has been previously programmed for operation as will be explained hereinafter, will thereby receive power at the terminal P. In this condition, relay K–1 is resting in deenergized condition, and upon momentary movement of the voter switch 22 to voting position, the contact S–1 will be closed thereby supplying ground return to the coil of relay K–1, thereby energizing the latter. Energization to relay K–1 causes contact K–1a to close with contact 50, while contact K–1e closed with contact 52 thereby providing interlock signals as will be explained hereinafter, at terminals 1a and 1b. The contact K–1b of the relay is of the "make-before-break" type. Hence, after contact 54 is made thereby locking relay K–1 in energized position, the contact 56 will open whereby providing a momentary ground potential at the vote signal terminal which is transmitted to the "N of M" mechanism as will be explained hereinafter. Simultaneously, contact K–1c will close, thereby energizing the appropriate vote register solenoid coil 30 (FIG. 5). Since the lamp behind the X mark on the ballot face is connected across the coil of relay K–1 it will be energized simultaneously therewith. Also the contact K–1d will open simultaneously thereby extinguishing the lamp L–1 behind the name plate at the voting position.

Whenever a voter makes a selection by depressing the voting switch 22 as shown in FIG. 6 for example, and subsequently decides to change his selection, he may cancel his prior selection by then deflecting the control switch 22 upwardly so as to close the contact S–2. This will short both ends of the relay K–1, thereby deenergizing it. Thus, all of the contacts of the relay mechanism will be restored to their original condition, and the lamp behind the X mark will be extinguished. The contact K–1b will thus be closed, thereby restoring the name light L–1 and supplying ground potential to the terminal 58 which will supply an appropriate cancel signal to the "N of M mechanism" as will be explained hereinafter.

When the programming board component of the machine as shown in FIG. 10 is programmed by the machine custodian, as will be explained hereinafter for "straight ticket voting," the straight ticket vote signal in the form of a negative potential will be received at the straight ticket terminal 59 (FIG. 6), thereby energizing relay K–1. As explained hereinabove this will cause the circuitry of FIG. 6 to act as though the voter had closed contact S–1 of switch 22. Referring again to interlock terminal arrangement at 1a, 1b, whenever the relay contacts K–1a is in condition as shown in FIG. 6, in contact with terminal 60, it will prevent relay K–1 from becoming energized, assuming that the incoming signal at terminal 1a is at ground potential. Thus, a ground potential signal coming from the "N of M counter" (as connected with group offices) or a similar signal coming from a companion voting position at terminal 1a, will be effective in preventing voting at the position shown in FIG. 6. On the other hand, assuming the programming board is programmed for single office operation, any voting of the circuit of FIG. 6 will cause the contacts K–1a to close with contact 50 and thereby supply a ground potential signal to companion voting positions, thereby preventing them from being voted. The terminal 1b and its associated relay contacts K–1e are operated in similar fashion to provide suitable interlocks in connection with endorsed candidate procedure.

Whenever the programming board of the machine is arranged by the machine custodian for straight party voting procedures, as will be explained hereinafter, the circuit shown in FIG. 7 titled "Straight Ticket Vote Controls" will become operative. For example, assuming that the circuitry of FIG. 6 is used as the straight ticket selecting position as shown at 62 (FIG. 11), the voting position in association with the switch 62 will have its vote terminal 64 (FIG. 6) connected through the programming board to the straight party input terminal 66 (FIG. 7). Hence movement of the switch 62 to vote position will transmit the momentary ground potential from terminal 64 (FIG. 6) to terminal 66 (FIG 7) and energize relay K–12 (FIG. 7). The contacts of the relay K–12 will thereupon close and supply ground potential to all candidate selecting positions of the selected party through the terminal 59 (FIG. 6). Thus, for example, as shown in FIG. 7, the terminals associated with the relay 12 may be assigned party A, while the terminals associated with relay K–13 may be assigned to party B, and so on.

FIG. 10 illustrates schematically one form of programming board that may be used, and as shown therein the board includes a power terminal block 70 comprising a plurality of terminals 40 as referred to hereinabove. Thus, an output at 40 of the voting unit main control circuitry as shown in FIG. 7, is connected into the programming board at the power block section 70 thereof. The programming board also includes a section 72 having power interlock terminals for use when programming the unit for restricted voting arrangements. The programming board also includes a section designated 74 providing terminals associated with the straight ticket vote control circuitry as shown in FIG. 7; and a number of sections 76 each of which provides terminals associated with voting position circuitries as shown in FIG. 6. Section 78 of the programming board provides terminals associated with the "N of M counter" circuitry as shown in FIG. 8. Thus the programming board makes provisions for alternative interconnections of the circuitry blocks referred to hereinabove whereby the unit may be selectively programmed at will to adapt the unit to the required selection ballot. Typical programming arrangements will now be described in detail.

FIG. 11 provides a fragmentary showing of a typical ballot layout for a "vote for one" type election, and a typical programming arrangement for use in conjunction with such a ballot is shown in FIG. 12. As shown therein a conductor 78 is arranged to provide power from the power block 72 to the P terminals of the applicable voting positions corresponding to the ballot of FIG. 11. Similarly, a conductor 80 is arranged on the programming board to provide ground connections to all applicable voting points. To provide interlocks to prevent overvoting for any one office, the terminals 1a of each voting position associated with each office are connected together by means of conductors 82. For example, if voting positions A2 and C2 are assigned to a single candidate endorsed by two parties, the "endorsed candidate interlock" would be effected by means of conductors 84 arranged to interconnect the terminals 1b, of the corresponding voting positions.

FIG. 13 is a fragmentary illustration of a typical ballot format set up for a "restricted voting" arrangement, such as in an "open primary" arrangement. For example, as shown herein the voter has the choice of making his selection within either the Republican or Democratic party. The programming for such an arrangement is illustrated by FIG. 14 wherein a conductor 86 is arranged to provide supply power through a key operated "Republican" switches 88 to all of the voting selection points assigned on the ballot to the Republican candidates; while a conductor 90 is simultaneously arranged to supply power thorugh the "Democratic" switches 92 to the voting positions assigned to the Democratic candidates on the ballot. To prevent overvoting within either office, the terminals 1a are interconnected by suitable conductors to effect the required interlock in a manner identical to that shown and explained hereinabove in connection with FIG. 12. Also, all applicable voting positions are grounded through the conductors indicated at 94.

In event a ballot such as shown in FIG. 11 requires "straight ticket" voting arrangements, the programming board of the device will be programmed as shown for example in FIG. 15. As shown therein points A1 and B1 are assigned for straight ticket voting, for either the Republican or Democratic party. As shown in FIG. 15 the board is basically programmed as shown in FIG. 12, but in addition thereto a conductor 96 is employed to receive straight ticket vote selections for the Republican Party, which is used to energize "straight ticket" vote circuitry as shown in FIG. 7. The output of 98 is conveyed by conductors 100 to automatically vote positions A2, A3 (FIG. 11). Similarly, straight ticket voting of the Democratic Party candidates will be effected by use of conductor 102 leading to vote positions B2, B3. To provide an interlock arrangement to limit any one voter's selection to one straight ticket vote, a conductor as illustrated at 104 is provided on the programming board to prevent more than one straight ticket voting.

FIG. 16 is a fragmentary illustration of a typical set up or ballot format for a "group office" arrangement, whereby each voter is allowed to make only a predetermined number of selections from a larger number of candidates. For example, as shown in FIG. 16, each voter may select any three out of the five candidates listed on the ballot. The programming for such an arrangement is illustrated by FIG. 17, whrein the programming arrangement utilizes an N of M counter, the circuitry for which is shown in detail in FIG. 8. The terminals of the circuitry of FIG. 8 are indicated on FIG. 10 within that portion blocked off and designated by the numeral 78.

The function of the N of M counter device is to count the number of selections entered by a voter, as well as any cancellations of any previous selections entered by the same voter; the difference between the number of voting selections and cancellations being automatically summed to give the final number of votes. The mechanism includes an interlock arrangement which is operable to prevent overvoting as soon as the actual number of final votes equals the predetermined number of allowed votes. Thus for example as shown in FIG. 8, the N of M counter and interlock system includes a vote stepper switch as indicated at 106. The vote counting section of this switch is indicated at 108. A cancel stepper as indicated at 110 is provided to count the vote cancellations; in each case the entry of votes or cancellations thereof being accompanied by clockwise step-by-step advancements of contact arms as indicated at 112, 114, respectively.

The interlock arrangement is provided by energization of relay K–11, whereby upon closing of the contacts thereof through the programming connections as shown in FIG. 17 (as will be explained more fully hereinafter) the terminal 1a will become grounded thereby preventing energization of relay K–1. This in turn prevents entry of any further votes. The N of M counter device also includes a relay K–7 which responds to vote selections, and a relay K–6 which responds to cancellation entries.

As explained hereinabove, the relay K–9 is normally energized when the voting unit awaits a new voter. The relay coil K–9 is shown in FIG. 7, while its contacts K–9a and K–9b, K–9c and K–9d are shown at the top portion of FIG. 8 of the drawing herewith. Although in FIG. 8 the contacts are shown in their deenergized positions, as previously explained, before the voter enters the machine these contacts are in positions opposite to those shown in FIG. 8. As shown therein, the switch arms 112, 114, are in their "home" positions, but as soon as they are displaced therefrom their corresponding "off normal" switches 116, 118, will be closed as shown in FIG. 8. Thus, when the equipment is in standby position, and the vote stepper is in "off-normal" position, the vote stepper coil 120 will be energized through contact K–9a; the circuit being completed through contact K–11g, vote stepper interrupter switch 122, and contact K–9d. Hence the coil will be energized through its interrupter contacts 122, and will rotate continuously until the switch sliding arm 112 reaches its "home" or normal position and thereupon opens and interrupts the power supply. Similarly, the cancel stepper coil 124 is energized through switch 118, contact K–9b, switch interrupter 126, and contact K–9c. Hence the cancel stepper 124 will be continuously energized to rotate until the switch arm 114 reaches "home" or normal position, whereupon it interrupts the power supply by opening of the switch 118. Thus, whenever a new voter opens the machine, the vote stepper and cancellation devices are positively disposed in their "home" positions.

As previously explained, whenever the voter makes a voting selection and depresses the switch lever 22 as shown in FIG. 6, a momentary ground potential will be applied to terminal point 64. Through the backboard programming arrangement this point is connected to the N of M input terminal 64 shown in FIG. 8, whereby the coil of relay K–7 will be grounded momentarily. Contact K–7a is thereby closed and momentarily provides a ground return to vote selection coil 120, and this in turn causes the stepper switch 106 to be advanced by one step. However, whenever the voter cancels a previous selection, as by elevating the switch lever 22 of FIG. 6, the contact 58 will be thereby grounded. Through the backboard programming this contact is interconnected to the terminal 58 of FIG. 8, and this voltage step function at terminal 58 is differentiated, providing a momentary ground signal through conductor 128 to the coil 130 of relay K–6. As a result, relay K–6 is energized and its contact K–6a will be closed, thus providing a ground return to the cancel stepper coil 124. Hence the cancel stepper 110 will advance its sliding arm 114 by one step.

The interlock system is initially set up, according to the permissible number of votes, by interconnection of appropriate terminals of the vote stepper section 108 with contacts of the cancel stepper 110; and these interconnections are accomplished in the backboard programming arrangement as shown for example in FIG. 17. As shown in FIG. 8, the terminal block including the terminals corresponding to the contacts of the vote stepper 108 is indicated at 132, and appears on the backboard as the bank of terminals designated 132 in FIG. 17. Similarly, the terminal block 134 of FIGS. 8 and 17 corresponds to the contacts of the cancel stepper switch 110. Thus, to program the unit in connection with the ballot of FIG. 16 for example to permit three selections for a particular office, the backboard jumpers will be arranged as shown to interconnect counter blocks 132–134 in FIG. 17. Thus, if only three vote selections are made, the sliding arm 112 will rest on number 3 contact while the cancel stepper sliding arm will remain at its "home" position. The vote stepper sliding arm 112 will be supplied with positive voltage through conductor 136, and thus this voltage will be transmitted to contact 3 on terminal block 132 (FIG. 17) whereupon it will be conducted by means of the jumper terminal number 1. Thence it will be transmitted to the cancel stepper sliding arm 114 through the coil of relay K–11, thereby energizing it and providing the interlock action as explained hereinabove which will prevent any further voting until a cancellation is entered.

If, however for example, two cancellations are now entered by the voter, the cancel stepper sliding arm will be advanced and will now rest upon contact unit 3 of the cancel stepper unit 110. The interlock action will thus be removed by deenergization of the relay K–11, and the interlock action will not be reinstated until such time as the voter may enter additional votes thereby advancing the sliding arm 112 to position 5 on the voting stepper unit section 108. As shown in FIG. 17, vote selection position 5 is interconnected by means of the programming to cancel stepper number 3, thereby providing a closed path for energization of the coil of the relay K–11 to reestablish the interlock action as explained hereinabove. Thus it will be appreciated that the interlock action of the device may be programmed to respond to the entry of any predetermined number of votes by simple rearrangements of the jumper devices interconnecting terminal blocks 132–134 (FIG. 17).

Some local election laws require provisions in a voting machine whereby each voter must make a predetermined number of vote selections for a given office, or else none of his votes will be counted in connection with that office. This is sometimes referred to as the "anti-one-shot" rule. In the case of the present invention this provision is made by supplying positive voltage to the counter coil through terminals 138 (FIG. 8 and FIG. 17). By the arrangement shown in FIG. 8, if the correct number of votes have been entered the relay K–11 will be energized and the contacts K–11a and K–11b thereof will be closed, thereby transmitting positive voltage to the coils of the register counters. If, however, the proper number of votes have not been entered the relay K–11 will remain deenergized, whereby the contacts K–11a and K–11b will remain open, thereby precluding energization of the register counters.

Also, as illustrated by FIG. 16, the ballot format may be arranged to accommodate a "straight ticket" voting requirement in conjunction with a group office ballot arrangement. In this case the voting points A1, B1, would be programmed into the voting circuitry to provide facilities for straight ticket voting. Thus if the voter wishes to vote a straight Republican ticket for example, he needs only to manipulate the voting switch 62 at the voting position A1 as shown in FIG. 16. The programming for such an arrangement is illustrated by FIG. 18.

It will be observed that the programming arrangement of FIG. 18 includes the programming arrangement of FIG. 17, and in addition thereto employs programming connections to the voting positions behind the switches 62 as shown in FIG. 16. It will be noted that instead of transmitting power direct from the voting position power supply terminals 40 to the voting points as shown in FIG. 17, in the arrangement of FIG. 18 the power supply is diverted through the N of M "clear" terminals as indicated at 139 within the N of M counter device, from whence it is transmitted to the active vote selection points including the straight ticket voting points A1 and B1. The interlock and cancel signal transmission programmings are identical. Additionally, a programming conductor is arranged to transmit straight ticket vote signals from voting position A1 terminal 150 (FIG. 18) to the party line terminal A as indicated at 152. Similarly, voting station B1 terminal 154 will be interconnected with terminal B as indicated at 156 of the N of M counter circuitry. The functioning of the N of M mechanism in this connection will be more fully explained hereinafter. Then, the output signals from the N of M mechanism will be received by the corresponding terminals 158, 162 (FIGS. 18 and 8) and transmitted therefrom through the backboard programming to the straight party input terminals 66 and 164 (FIGS. 18 and 7). As previously mentioned in conjunction with FIG. 15, a straight party vote signal will be transmitted from straight party vote terminals 98 to the terminals 59 (FIGS. 18 and 6) of the corresponding points to be voted by the straight ticket selection.

Operation of the N of M mechanism (FIG. 8) during a straight ticket voting regime will now be discussed in detail. Assuming for example that switch 62 at straight ticket voting selection point A1 (FIGS. 16 and 6) is actuated by the voter, depression of the voting switch 62 (FIG. 6) will provide a temporary ground potential at terminal 64 (FIG. 6) which corresponds to terminal 150 on FIG. 18. This ground potential will then be transmitted through the programming arrangement as shown in FIG. 18 to point 152 of the N of M circuitry, as shown in FIGS. 8, 18. This will cause momentary energization of relay K–1A. This operation of the relay will cause its contact K–1A–a to close and thereby energize K–2A. The contact K–1A–c thereof will thereupon be closed causing energization of relay K–5, provided that the cancel stepper switch ST–2 as shown at 118 is in its "off normal" position. Whenever relay K–5 is energized its contact K–5b will close, and through the interrupter contact 126 will force the cancel stepper ST–2 to advance to its "home" position. Simultaneously with actuation of relay K–2A, its contact K–2A–d will be closed, thereby through interrupter switch 122 will cause the vote stepper ST–1 to advance to its "home" position. Thus, any N of M votes or cancellations previously stored therein, will be erased. Simultaneously with actuation or relay K–1A, its contact K–1A–e will open thereby interrupting transmission to all of the voting points on the face of the machine, thereby restoring all previously voted points to original positions, and hence the entire machine is now restored to "unvoted" condition.

With the actuation of relay K–2A, its contact K–2A–c will close thus providing ground potential to terminal 158 (FIGS. 8 and 18) and from thence through the backboard programming to terminal 66 (FIGS. 18 and 7). Hence, as shown in FIG. 7, relay K–12 will be energized, and its contacts K–12a, K–12b etc. will close, and thus provide ground potential through the row of terminals designated 98 (FIGS. 7, 18). The programmed terminals of group 98 will then transmit ground potentials to the corresponding terminals 59 (FIGS. 18, 6), and as seen from FIG. 6, the ground potential at each voting point will energize the corresponding relay K–1, thereby voting all candidates within the selected party. Simultaneously, closure of contact A–2a–c (FIG. 8) will energize relay K–6, provided relay K–5 is deenergized by homing action of cancel stepper switch ST–2 through its off normal contact 118 (FIG. 8). Simultaneously with actuation of relay K–2A, its contact K–2A–b will close and apply a positive voltage to the terminal of vote stepper ST–1 coil. Also contact K–2A–d will close and thereby complete the circuit, through the interrupter 122 to the vote stepper coil ST–1 (120 FIG. 8). Hence, the vote stepper will continuously advance.

As described in connection with the individual voting in group office procedure, the contact of wafer 108 of vote stepper ST–1 and the contact of wafer 110 of cancel stepper ST–2 has been previously appropriately programmed to accommodate no more than three votes, by way of example discussed hereinabove, and to thereupon establish an interlock preventing any further voting. Since the vote stepper ST–1 is now continuously advancing, provision must be made to stop it when the predetermined number of votes have been recorded by the position of the sliding arm 106 of the vote stepper ST–1. For this purpose the vote stepper ST–1 is provided with wafers 170, 172, and the vote selector bank 174 of terminals (FIGS. 8, 18) are programmed as shown therein so as to effectively interconnect contact 3 of the wafer 170 (FIG. 8) with vote selector input terminal 176 (FIGS. 8, 18). The sliding arm of wafer 170 is at a ground potential. Whenever it reaches contact 3 it thereupon shorts coil 120 of the vote stepper ST–1 and the coil of relay K–2A, thereby deenergizing these components and restoring the N of M counter circuitry to its "rest" position following recordings therein of the predetermined allowable number of votes. Then, as explained hereinabove, relay K–11 will be energized so as to set up an interlock preventing any further votes unless individual cancellations are in the meantime made. Of course it will be understood also that the above programming will permit individual cancellations to be entered, as may be limited by operation of the interlock arrangement. It will also be appreciated that whereas the explanation hereinabove was given by way of example in connection with the voting of party A, any straight ticket voting for party B will be similarly entered through terminal 156 and will operate the relays and circuitry shown in FIG. 8 corresponding to the component described hereinabove. Also, whereas the drawings and description herewith refer only to provisions for two parties, any additional number of parties may be added by corresponding extensions of the required circuitry components of the N of M counter mechanism as shown in FIG. 8.

Each voting position, as shown for example in FIG. 10, is assigned a counter device of the type shown in FIG. 5; the latter being physically located at any convenient place such as in a separate register cabinet as shown in FIG. 9. To operate the counters, the coils 30 thereof are actuated by program-interconnections with suitable power supplies and terminal connections at the corresponding voting positions, as indicated for example at 180 (FIGS. 5, 6, 10). Thus each time a voting motion is applied to a switch 22, the corresponding counter will operate provided however that an interlock prevention is not in effect, as explained hereinabove.

What is claimed is:

1. A vote receiving device for use in association with a vote register, said receiving device comprising a casing having a ballot face, said face including series of vertically and horizontally aligned voting positions, a voting switch at the front of each voting position in circuit with a relay memory device therebehind, a programming board associated with said casing and including separate banks of terminals each corresponding to a different voting position, an N of M counter device comprising means for summing vote and cancellation counts received from said voting positions and establishing an interlock against overvoting, a "straight ticket" voting control circuit, and programming control means adapted to be manually adjusted to optionally interconnect selected of said terminals with other of said terminals and with the N of M counter device and with said "straight ticket" voting control circuit, said relay memory device including a self-locking relay and associated circuitry adapted upon closing of the relay to transmit a count signal to the vote register.

2. A vote receiving device comprising a casing having a ballot face, said face including series of vertically and horizontally aligned identical voting positions each providing vote and cancel controls and associated circuitry and indication means showing actuation thereof, a programmable circuitry panel associated with said device and having a vote and cancel signal summer device and a vote signal distributing device and vote signal output terminals corresponding to said voting positions, and programming control means manually arrangeable to optionally interconnect selected of said voting control terminals with corresponding terminals of a vote registering device, said programming control means being also arrangeable for selective interconnections with said summer device and said distributing device.

3. A vote receiving device for use in association with a vote register, said receiving device comprising a casing having a ballot face, said face including series of vertically and horizontally aligned voting positions, a voting switch at the front of each voting position in circuit with a relay memory device therebehind, a programming board associated with said casing and including separate banks of terminals each corresponding to a different voting position, an N of M counter device comprising means for summing vote and cancellation counts received from said voting positions and establishing an interlock against overvoting, and programming control means adapted to be manually adjusted to optionally interconnect selected of said terminals with other of said terminals and with the N of M counter device, said relay memory device including a self-locking relay and associated circuitry adapted upon closing of the relay to transmit a count signal to the vote register.

4. A voting device comprising a vote registering device and a vote receiving device having a ballot face, said face including series of vertically and horizontally aligned identical voting positions, vote and cancel controls and associated circuitry at each of said positions, indication means showing actuation of said controls, a programmable circuitry panel associated with said registering device and having a vote and cancel signal summer device and a vote signal distributing device and vote signal output terminals corresponding to each of said voting positions, and programming control means manually arrangeable to optionally interconnect selected of said voting control terminals with corresponding terminals of said vote registering device, said programming control means being also arrangeable for selective interconnections with said summer device and said distributing device.

5. A vote receiving device for use in association with a vote register, said receiving device comprising a casing having a ballot face, said face including series of vertically and horizontally aligned voting positions, a voting switch at the front of each voting position in circuit with a relay memory device therebehind, a programming board associated with said casing and including separate banks of terminals each corresponding to a different voting position, an N of M counter device comprising means for summing vote and cancellation counts received from said voting positions and establishing an interlock against overvoting, a "straight ticket" voting control circuit, and programming control means adapted to be manually adjusted to optionally interconnect selected of said terminals with other of said terminals and with the N of M counter device and with said "straight ticket" voting control circuit.

6. A vote receiving device for use in association with a vote register, said receiving device comprising a casing having a ballot face, said face including series of vertically and horizontally aligned voting positions, a voting switch at the front of each voting position in circuit with a relay memory device therebehind, a programming board associated with said casing and including separate banks of terminals each corresponding to a different voting position, a plurality of N of M counter devices comprising means for summing vote and cancellation counts received from respective groups of said voting positions and establishing interlocks against overvoting in the corresponding groups of presented selections, a "straight ticket" voting control circuit, and programming control means adapted to be manually adjusted to optionally interconnect selected of said terminals with other of said terminals and with the N of M counter devices and with said "straight ticket" voting control circuit.

7. For use in a vote receiving device in association with a vote register, said receiving device including series of voting positions, voting and cancel switches at each voting position, a programming board including separate banks of terminals each corresponding to a different voting position, an N of M counter device comprising means for summing vote and cancellation counts received from said voting positions and establishing an interlock against overvoting, said N of M counter device including means for adding vote and cancel signals separately and means responsive to a prescribed difference count to establish a further vote prevention interlock when the prescribed permissible number of votes is reached.

8. For use in a vote receiving device in association with a vote register, said receiving device including series of voting positions, voting and cancel switches at each voting position, a programming board including separate banks of terminals each corresponding to a different voting position, an N of M counter device comprising means for summing vote and cancellation counts received from said voting positions and establishing an interlock against overvoting, a "straight ticket" voting control circuit, said N of M counter device including means for adding vote and cancel signals separately and means responsive to a prescribed difference count to establish a further vote prevention interlock when the prescribed permissable number of votes is reached, said N of M counter device being arranged to receive straight ticket vote signals from said straight ticket control circuit whereupon said N of M counter will automatically cancel all previously deposited votes and restore its accumulated vote and cancel counts to zero and thereupon advance its vote count equivalent to the number of votes cast by the straight ticket vote action.

9. For use in a vote receiving device in association with a vote register, said receiving device including series of voting positions, voting and cancel switches at each voting position, a programming board including separate banks of terminals each corresponding to a different voting position, an N of M counter device comprising means for summing vote and cancellation counts received from said voting positions and establishing an interlock against overvoting, a "straight ticket" voting control circuit, said N of M counter device including means for adding vote and cancel signals separately and means responsive to a prescribed difference count to establish a further vote prevention interlock when the prescribed permissible number of votes is reached, said N of M counter device being arranged to receive straight ticket vote signals from said straight ticket control circuit whereupon said N of M counter will automatically cancel all previously deposited votes and restore its accumulated vote and cancel counts to zero and thereupon advance its vote count equivalent to the number of votes cast by the straight ticket vote action, said N of M counter device being then adapted to receive further individual votes and cancellations within the prescribed limits thereof.

10. For use in a vote receiving device in association with a vote register, said receiving device including series of voting positions, voting and cancel switches at each voting position, a programming board including separate banks of terminals each corresponding to a different voting position, an N of M counter device comprising means for summing vote and cancellation counts received from said voting positions and establishing an interlock against overvoting, a "straight ticket" voting control circuit, said N of M counter device including means for adding vote and cancel signals separately and means responsive to a prescribed difference count to establish a further vote prevention interlock when the prescribed permissible number of votes is reached, said N of M counter device being arranged to receive straight ticket vote signals from said straight ticket control circuit whereupon said N of M counter will automatically cancel all previously deposited votes and restore its accumulated vote and cancel counts to zero and thereupon advance its vote count equivalent to the number of votes cast by the straight ticket vote action, said N of M counter being adapted to be programmed to transmit and to enter its vote count within prescribed limits.

11. For use in a vote receiving device in association with a vote register, said receiving device including series of voting positions, voting and cancel switches at each voting position, a programming board including separate banks of terminals each corresponding to a different voting position, an N of M counter device comprising means for summing vote and cancellation counts received from said voting positions and establishing an interlock against overvoting, said N of M counter device including means for adding vote and cancel signals separately and means responsive to a prescribed difference count to establish a further vote prevention interlock when the prescribed permissible number of votes is reached, said N of M counter device also including means preventing registration of all previous votes entered for the corresponding office if the prescribed number of votes has not been entered.

12. A vote receiving device comprising a casing having a ballot face, said face including series of vertically and horizontally aligned identical voting positions each providing vote and cancel controls and associated circuitry and indication means showing actuation thereof, a programmable circuitry panel associated with said device and having a vote and cancel signal summer device and a vote signal distributing device and vote signal output terminals corresponding to said voting positions, and programming control means manually arrangeable to optionally interconnect selected of said voting control terminals with corresponding terminals of a vote registering device and being arrangeable for selective use of only certain of said voting positions to provide prescribed voting restrictions.

13. In a vote receiving device, a plurality of voting position circuits; a programming board having a plurality of individual terminals; each voting position circuit including a plurality of switches, an actuator therefor and a normally open selector switch for said actuator; there being a power input group of said programming board terminals of a number corresponding to the number of said actuators and individually connected thereto, there being a power ground group of said programming board terminals corresponding in number to the number of said selector switches and individually connected thereto; said selector switches being connected to corresponding actuators to complete, when closed, circuit from a given power input terminal, through the actuator and selector switch to a given power ground terminal; one of said plurality of switches of each voting position circuit having a movable contact connected to an individual terminal of a further group of terminals of said programming board and having a normally closed position connected internally of the circuit to the power input side of said actuator and having an actuated position connected to power ground.

14. In the device according to claim 13 wherein each selector switch is movable to an alternate "cancel" position shorting between the power input and power ground sides of said actuator.

15. In the device according to claim 13 including a "vote or record" circuit including a manual switch movable between "vote" and "record" positions, a relay connected at one side to a source of power and at its other side through a "vote" contact of said manual switch to the ground of said power source.

16. In a vote receiving device, in combination, a plurality of voting position circuits, a programming board having a plurality of terminals, each voting position circuit having:
 (a) a power input terminal,
 (b) a manually operated vote-cancel switch,
 (c) switch means connected to said power input terminal and to said vote cancel switch for on-off operation by the latter,
 (d) a terminal connected through said switch means for selective connection to said power input terminal and to ground when said switch means is in off and on condition respectively,
 (e) a "straight ticket" terminal connected to said switch means and adapted to actuate the same to "on" condition independently of said vote-cancel switch,
 (f) a terminal connected through said switch means to said power input terminal when the switch means is in "on" condition,
 (g) a pair of terminals, each connected to said switch means, one to ground when said switch means is in "on" condition and the other to ground when said switch means is in "off" condition,
 (h) a vote register terminal connected through said switch means to said power input terminal when said switch means is in "on" condition,
an N of M counter connected to said pair of terminals (g) for forward and reverse drive thereby, and vote register means connected to said terminal (h).

References Cited in the file of this patent
UNITED STATES PATENTS

| | | |
|---|---|---|
| 1,170,731 | Bohan et al. | Feb. 8, 1916 |
| 2,750,108 | Keith | June 12, 1956 |
| 2,768,784 | Gordon et al. | Oct. 30, 1956 |
| 2,893,635 | Gitzendanner | July 7, 1959 |
| 2,940,663 | Fechter et al. | June 14, 1960 |